(12) United States Patent
Na et al.

(10) Patent No.: US 8,700,805 B2
(45) Date of Patent: Apr. 15, 2014

(54) METHOD FOR SYNCHRONIZING CLOCKS IN A COMMUNICATION NETWORK

(75) Inventors: Chongning Na, Beijing (CN); Dragan Obradovic, Ottobrunn (DE); Ruxandra Scheiterer, Geretsried (DE)

(73) Assignee: Unify GmbH & Co. KG, Munich (DE)

( * ) Notice: Subject to any disclaimer, the term of this patent is extended or adjusted under 35 U.S.C. 154(b) by 356 days.

(21) Appl. No.: 13/054,639

(22) PCT Filed: Sep. 2, 2008

(86) PCT No.: PCT/EP2008/007167
§ 371 (c)(1),
(2), (4) Date: Mar. 2, 2011

(87) PCT Pub. No.: WO2010/025743
PCT Pub. Date: Mar. 11, 2010

(65) Prior Publication Data
US 2011/0161524 A1 Jun. 30, 2011

(51) Int. Cl.
*G06F 15/16* (2006.01)
(52) U.S. Cl.
USPC .............................. 709/248; 713/375; 375/354
(58) Field of Classification Search
USPC .............................. 709/248; 375/354; 713/375
See application file for complete search history.

(56) References Cited

U.S. PATENT DOCUMENTS 6,661,810 B1    12/2003    Skelly et al.

FOREIGN PATENT DOCUMENTS

| WO | 01/50674 | * | 7/2001 | H04L 7/04 |
| WO | 01/50674 A1 | | 7/2001 | |
| WO | 2005/020486 A1 | * | 3/2005 | H04J 3/06 |

OTHER PUBLICATIONS

International Search Report for PCT/EP2008/007167 dated Jun. 5, 2009 (Form PCT/ISA/210) (English Translation).

(Continued)

*Primary Examiner* — Jude Jean Gilles
*Assistant Examiner* — Jaren M Means
(74) *Attorney, Agent, or Firm* — Buchanan Ingersoll & Rooney PC

(57) ABSTRACT

The invention refers to a method for synchronizing clocks in a communication network, wherein a first clock of a first network element (MA) which is a master element is used for synchronizing second clocks of one or more second network elements which are slave elements. According to the method of the invention, a first sequence of first messages transmitted from the first network element to the second network element and/or a second sequence of second messages transmitted from the second network element to the first network element is recorded. First messages and/or second messages out of those sequences are identified by using an appropriate threshold function with respect to the transmission delays of those messages. Those identified messages have the same constant minimum delay, and based on those messages clock synchronization between the first clock and the second clock is performed. The invention has the advantage that clock synchronization is possible even if an intermediate switch causing an unknown delay is located in the transmission path between the first and the second network element. This is because most of the messages are transmitted within a minimum constant delay via such an intermediate switch and, by identifying those messages, a line delay between the first network element and second network element can be estimated and used for synchronizing the second clock with the first clock. The synchronization method of the invention is preferably used for synchronizing clocks in a DECT network. Furthermore, in a preferred embodiment, the first and second messages are messages according to the standard IEEE 1588.

20 Claims, 1 Drawing Sheet

(56) References Cited

OTHER PUBLICATIONS

Written Opinion of the International Searching Authority for PCT/EP2008/007167 dated Jun. 5, 2009 (Form PCT/ISA/237).

Mills, "Internet Time Synchronization: The Network Time Protocol", IEEE Transactions on Communications, vol. 39, No. 10, Oct. 1991, pp. 1482-1493.

* cited by examiner

METHOD FOR SYNCHRONIZING CLOCKS IN A COMMUNICATION NETWORK

CROSS-REFERENCE TO RELATED APPLICATIONS

This application is the United States national phase under 35 U.S.C. §371 of PCT International Application No. PCT/EP2008/007167, filed on Sep. 2, 2008. The priority document is incorporated by reference herein.

BACKGROUND OF THE INVENTION

1. Field of the Invention

Embodiments of the invention relate to methods for synchronizing clocks in a communication network as well as to a corresponding communication network.

2. Background of the Related Art

Clock synchronization is the basis for the proper functioning of different processes in communication networks, e.g. automation networks and cellular communication networks. In such networks, a first network element provides a first clock as a master clock and other second network elements using second clocks synchronize their clocks with the first clock.

There are several standards for clock synchronization, e.g. the standard IEEE 1588 (IEEE=Institute of Electronics and Electrical Engineers). In known synchronization standards, first messages in the form of sync messages are transmitted from the first network element to the second network elements and second messages in the form of line delay requests are transmitted from the second network elements to the first network element. The exchanged messages include time stamps of the first clock of the first network element as well as of the second clocks of the second network elements. Based on those messages, the line delay between the first network element and the second network elements can be calculated and a synchronization of the second clocks in the second network elements with the first clock of the first element can be performed.

Known synchronization methods work well unless there are delays caused by further network elements between the first network element and the second network elements, said further network elements not being part of the synchronization process. This is because those intermediate network elements may cause arbitrary delays, e.g. due to congestion, not enabling a correct calculation of the line delay between the first network element and the respective second network elements.

BRIEF SUMMARY OF THE INVENTION

Embodiments of the invention may provide a method for synchronizing clocks in a communication network and a corresponding communication network, wherein the clock of a second network element can be synchronized with the clock of a first network element even in case that intermediate network elements causing unknown delays are located in the transmission path between the first network element and the second network element.

DETAILED DESCRIPTION OF THE INVENTION

Figure 1:
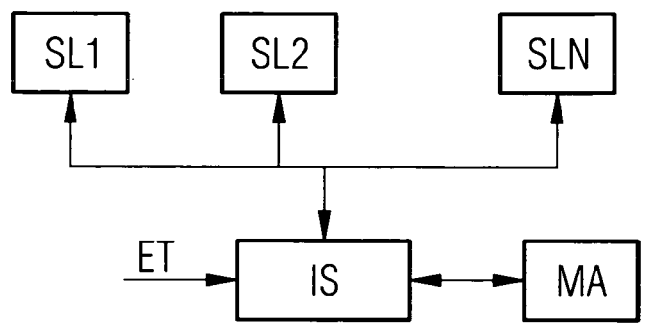
FIG. 1 shows an example of a communication network in which a synchronization method according to the invention may be incorporated.

In an embodiment of a synchronization method according to the invention, a first clock of a first network element is used for synchronizing second clocks of one or more second network elements. The first network element may be of the same type as the second network element but may also be a different network element. The clock of this first network element is used as a so-called master clock for synchronizing the other second clocks of second network elements in the communication network. First messages transmitted from the first network element to a second network element and/or second messages transmitted from the second network element to the first network element are processed for synchronization. In a preferred embodiment, both first and the second messages are used in the synchronization process in order to eliminate an unknown offset between the clocks of the network elements.

In a method according to the invention, a first sequence of first messages and/or a second sequence of second messages are recorded, each sequence comprising a number of messages subsequently transmitted between the first and second network elements. The first sequence includes for each first message an information about a first delay for transmitting the first message from the first to the second network element and the second sequence includes for each second message an information about a second delay for transmitting the second message from the second to the first network element. The first and/or second delays may be included in the information about the first and/or second delays implicitly or explicitly.

In a next step, a first set of first messages is identified out of the first sequence and/or a second set of second messages is identified out of the second sequence. Each first message of the first set has been transmitted within a first delay below a first threshold function from the first to the second network element and each second message of the second set has been transmitted within a second delay below a second threshold function from the second to the first network element. The expression "below a first/second threshold function" may include or exclude messages transmitted with a delay having the value of the first/second threshold function. The first threshold function is defined such that it filters first messages with a minimum delay out of the first sequence and the second threshold function is defined such that it filters second messages with a minimum delay out of the second sequence. Different methods may be used for identifying the first and/or second set of messages. Particularly, in some embodiments, the first and/or second set of messages may be identified without explicitly calculating the first and/or second delays and/or the first and/or second threshold functions. Based on the first and/or second set of messages, a line delay for messages transmitted between the first and the second network elements is estimated and synchronization of the second clock with the first clock is performed based on the estimated line delay.

According to the invention, it was realized that, even if intermediate network elements causing arbitrary delays are part of the network, the majority of the messages is transmitted with a minimum constant delay. Hence, those messages can be filtered out by defining an appropriate threshold function for the delay. As all those messages have the same delay, a line delay can be estimated and clock synchronization can be performed.

In a preferred embodiment of the invention, the first network element records a first counter value according to the first clock at the time of sending a first message and the second network element records a second counter value according to the second clock at the time of receiving the first message. Based on these counter values, the first delay is expressed as a difference between the second counter value at the time of receiving the first message and the first counter value at the time of sending the first message. In order to enable a calculation of the first delay in the second network element, the first messages are preferably synchronization messages, each including the first counter value recorded by the first network element. Hence, the first counter value is available in the second network element and the above difference between the second counter value and the first counter value can be calculated in the second network element.

In another preferred embodiment, the second network element records the second counter value according to the second clock at the time of sending a second message and the first network element records a first counter value according to the first clock at the time of receiving the second message. Based on these counter values, the second delay can be expressed as a difference between the first counter value at the time of receiving the second message and the second counter value at the time of sending the second message. Preferably, the second messages are request messages sent from the second network element to the first network element. Upon receipt of a request message, the first network element sends a response message including the first counter value at the time of receiving the second message to the second network element. As a consequence, the first counter value at the time of receiving the second message is available at the second network element so that the above difference between the first counter value at the time of receiving the second message and the second counter value at the time of sending the second message can be calculated in the second network node.

In a preferred embodiment of the invention, the first threshold function is a constant function comprising the minimum of the first delays in the first sequence plus a first constant value and/or the second threshold function is a constant function comprising the minimum of the second delays in the second sequence plus a second constant value. According to this threshold functions, small variations in the delays, e.g. due to jitter and errors in time stamping, are taken into account in order to determine the correct number of messages transmitted with a constant minimum delay. Preferably, the first and/or second constant values depend on the maximum clock frequency difference between the first clock and the second clock. Moreover, the first constant value preferably depends on the difference between the second counter value at the time of receiving the latest first message in the first sequence and the second counter value at the time of receiving the oldest first message in the first sequence. Analogously, the second constant value preferably depends on the difference between the second counter value at the time of sending the latest second message in the second sequence and the second counter value at the time of sending the oldest second message in the second sequence. Furthermore, appropriate factors for controlling the magnitude of the first and/or second constant values may be used to find the correct number of messages transmitted with a minimum delay. Preferably, the factors for controlling the magnitude are smaller than one.

The first threshold function may also be an approximation of a first linear function expressing the dependency of the first delay on the time of sending the corresponding first message plus a first constant threshold value or the dependency of the time of receiving the first message on the time of sending the first message plus a first constant threshold value. To do so, the time of sending the corresponding first message is preferably expressed as the corresponding first counter value recorded at the time of sending the corresponding first message.

When using a threshold based on an approximation of a first linear function, the first set of messages is preferably identified in an iteration. In each iteration step of this iteration, the first linear function is approximated and those first messages are removed from the first sequence which are transmitted within first delays above the approximated first linear function plus the first constant threshold value, whereupon the reduced number of first messages of the first sequence no longer including the removed messages is used in the next iteration step for approximating the first linear function. This iteration enables an accurate determination of first messages with a minimum delay. Preferably, the iteration terminates when all first delays are below the first linear function plus the first constant threshold value. The above expressions "above/below the first linear function plus the first constant threshold value" may include or exclude first delays having the value of the first linear function plus the first constant threshold value. The above expressions "above/below the first linear function plus the first constant threshold value" may include or exclude first delays having the value of the first linear function plus the first constant threshold value.

Analogously to the first threshold function, the second threshold function may be an approximation of a second linear function expressing the dependency of a second delay on the time of sending a corresponding second message plus a second constant threshold value or the dependency of the time of receiving the second message on the time of sending the second message plus a second constant threshold value. The time of sending the corresponding second message may be expressed as the corresponding second counter value recorded at the time of sending the corresponding second message.

The second set of second messages may also be identified in an iteration. In each iteration step of this iteration, the second linear function is approximated and those second messages are removed from the second sequence which are transmitted within second delays above the approximated second linear function plus the second constant threshold value, whereupon the reduced number of second messages of the second sequence no longer including the removed messages are used in the next iteration step for approximating the second linear function. The iteration preferably terminates when all second delays are below the second linear function plus the second constant threshold value. The expression "above/below the second linear function plus the second constant threshold value" may include or exclude delays having the value of the second linear function plus the second constant threshold value.

In another preferred embodiment, the line delay is estimated based on a mean delay derived from the first set of first messages and/or the second set of second messages. The use of the mean values enables a very accurate determination of messages with a minimum delay.

For estimating the line delay, a rate compensation value is used in a preferred embodiment, the rate compensation value representing the ratio of the clock frequency of the first clock to the clock frequency of the second clock. An accurate rate compensation value can be determined based on the following differences:

a first difference being the difference between the maximum and minimum first counter values at the time of sending a first message, the maximum and minimum first counter values being chosen out of the first set of first messages, a second difference being the difference between the maximum and minimum second counter values at the time of receiving a first message, the maximum and minimum second counter values being chosen out of the first set of first messages.

Preferably, the rate compensation factor is the quotient of the first difference and the second difference.

In a preferred embodiment, the above defined first and/or second messages are messages for clock synchronization according to the standard IEEE 1588 or IEEE 802.1as or IEEE 802.1av. Furthermore, the method of the invention is preferably performed in a wireless and/or wired communication network, particularly in a DECT network. In a DECT network, the method is preferably used for synchronizing the base stations in this network.

Besides the above method, embodiments of the invention also refer to a communication network comprising at least one first network element and one or more second network elements, the at least one first network element providing a first clock for synchronizing second clocks of the second network elements, wherein the communication network is adapted to perform any variant of the above described methods according to the invention.

Embodiments of the invention will now be described with respect to the accompanying drawings.

FIG. 1 shows an example of a communication network in the form of a DECT communication system. The communication systems includes a master element MA and a plurality of slave elements SL1, SL2, ..., SLN. The master element as well as the slave elements are base stations in a DECT system, each having an internal clock. The clock of the a priori selected master element is used for synchronization with each internal clock of the slave elements. To do so, the master element and the slave elements exchange messages. In the embodiment described hereinafter, those messages are based on the synchronization standard IEEE 1588 which specifies the messages needed for synchronization but not how the carried information should be used for clock corrections. The messages are exchanged via existing wired communication lines indicated as arrows in FIG. 1.

In the network of FIG. 1, a further network element in the form of an intermediate switch IS is located between the master element MA and the slave elements SL1 to SLN so that the messages used for synchronization have to pass this intermediate switch. Contrary to the master element and the slave elements, the intermediate switch does not conform to the synchronization standard IEEE 1588, i.e. the intermediate switch does not include a clock to be synchronized. The intermediate switch may be used for receiving external traffic from other sources in the communication network. This external traffic is indicated by the arrow ET in FIG. 1. Due to the intermediate switch IS, messages can be arbitrarily delayed due to congestion reasons so that a proper synchronization with methods according to the prior art is not possible. The invention as described hereinafter solves this problem by using a statistical filtering method. In the following, the method of the invention is described for the star architecture as shown in FIG. 1, where the master element MA communicates individually with each slave element SL1 to SLN. Nevertheless alternative architectures are possible, e.g. where the master element communicates with one of the slave elements via one or more intermediate slave elements.

According to the standard IEEE 1588, so-called sync messages originating from the master element contain a time stamp of the master clock in the form of a counter, the time stamp indicating the time when the message was sent by the master element. The slave elements process this information and estimate the master time according to the master clock at the receiving of the sync messages and then correct their clocks accordingly. The processing performed by the slave element includes an estimation of the time delay a sync message needs to reach the slave element and the estimation of this time delay is added to the received master time contained in the sync message. For the delay estimation, additional messages called line delay request and line delay response messages are used. The estimated line delay between the master element and the slave element consists of the pure transmission delay, i.e. the cable delay, and errors due to time stamping and quantization accuracy. Furthermore, in the network as shown in FIG. 1, a line delay comprises an unknown delay due to the processing in the intermediate switch IS.

Figure 2:
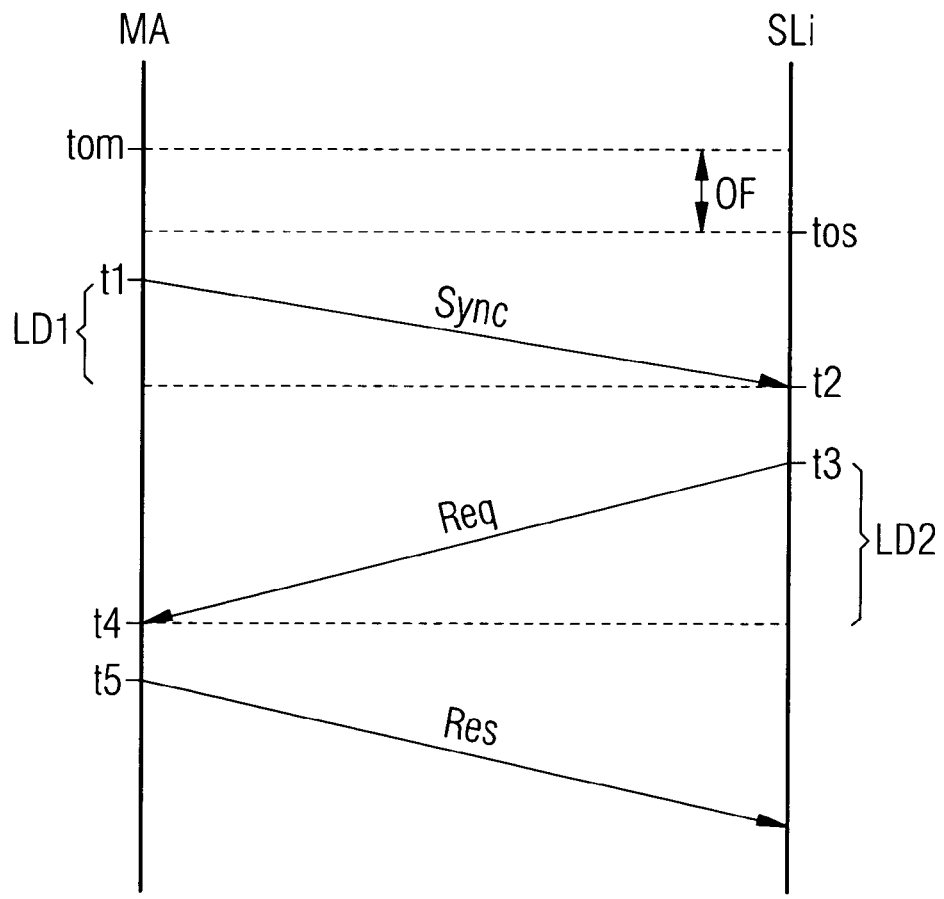
FIG. 2 shows a time diagram illustrating the messages used in an embodiment of the invention for synchronizing the clock of a slave element with the clock of the master element in the communication network of FIG. 1.

FIG. 2 shows a time diagram indicating the messages according to the standard IEEE 1588 exchanged between the master element MA and one of the slave elements SLi of the communication network shown in FIG. 1. The master element MA measures the time by master counters according to the master clock. The slave element SLi measures the time by slave counters according to the slave clock. The absolute time at the beginning of the counting of the slave element starts at Tos and is offset to the absolute time at the beginning of the counting Tom of the master element. This offset is indicated as OF in the diagram of FIG. 2. Due to this offset, the line delay has to be determined on messages sent from the master element to the slave element and from the slave element to the master element.

In the synchronization process as shown in FIG. 2, the master element MA sends at the time t1 a sync message Sync to the slave element SLi, the sync message arriving at the time t2 at the slave element SLi. The time delay for transmitting the sync message is indicated as LD1 in FIG. 2. The sync message Sync includes the master counter at the time of sending this message. After having received the sync message Sync, the slave element SLi sends at the time t3 a line delay request Req to the master element MA.

The line delay request message Req is received at the time t4 in the master element MA and the master counter corresponding to this time t4 is recorded in the master element MA. The time needed for transmitting the line delay request message Req is indicated as LD2 in FIG. 2. At the time t5, a line delay response message Res including the master counter at the time t4 of receiving the line delay request message Req is sent to the slave element SLi. This message is received at the time t6 in the slave element SLi. At this time, the slave element has the information about the times t1, t2, t3 and t4 because the slave counters at times t2 and t3 are recorded in the slave element and the master counters at times t1 and t4 are received in the slave element via the sync message Sync and the delay response message Res. In conventional networks, without an intermediate switch IS causing arbitrary delays, the line delay LD1 and LD2 have equal values, i.e. LD1=LD2=LD. Consequently, the line delay LD may be calculated as follows:

$$LD = \frac{(t_4 - t_1) - (t_3 - t_2)}{2}$$

As can be seen from FIG. 2, due to the intermediate switch IS, the line delays LD1 and LD2 have different values in size. However, the inventors found out that the majority of the delays LD1 and LD2 occurring in subsequent synchronization processes initiated by respective sync messages will pass the switch with a minimum and constant processing delay. Based on this finding, the method of the invention as described in the following will identify messages transmitted in this minimum delay out of a sequence of synchronization processes, each process corresponding to the process as shown in FIG. 2 and initiated by a corresponding sync message.

In the following, the $i^{th}$ sync message, i.e. the sync message of the $i^{th}$ synchronization process of the sequence of processes, carries the master counter $M_{sync,i}$ according to the master clock. Furthermore, the slave element records its local time $S_{sync,i}$ at the time when the sync message arrives. Each time when a new sync message arrives at the slave element, the slave element calculates the difference of these two counter values, i.e. $\delta_{sync,i} = S_{sync,i} - M_{sync,i}$.

The pair of counter values ($M_{sync,i}$, $S_{sync,i}$) and their difference ($\delta_{sync,i}$) are saved in a buffer of the slave element. This is possible because the slave element receives the counter value $M_{sync,i}$ with the sync message.

In the $j^{th}$ synchronization process, the slave element sends out the $j^{th}$ delay request message at the time $S_{req,j}$. The master element records its local time $M_{req,j}$ when the delay message arrives. This local time will be later sent to the slave element by a delay response message. Each time when a delay response message is received by the slave element, the slave element calculates the difference between the counter values $M_{req,j}$ and $S_{req,j}$, i.e.:

$$\delta_{req,j} = S_{req,j} - M_{req,j}$$

The pair of counter values ($M_{req,j}$, $S_{req,j}$) and the difference ($\delta_{req,j}$) are saved in the buffer of the slave element.

Based on the above definitions, an embodiment of the method according to the invention is performed as follows:

At first, so-called "good" sync messages of the sequence of sync messages are identified. To do so, when the $i^{th}$ new sync message arrives at the slave element, the slave element stores $M_{sync,i}$, $S_{sync,i}$, $\delta_{sync,i}$ in its buffer, as mentioned before.

Thereafter, the minimum difference $\delta_{sync,min} = \min\{\delta_{sync,i-Nsync+1}, \ldots \delta_{sync,i}\}$ of all differences of the sequence of $N_{sync}$ synchronization processes is determined.

Based on this minimum difference $\delta_{sync,min}$, good messages {good sync MSG}, whose counter difference is smaller than the minimum difference plus a threshold $\alpha_{delay,i}$ are identified. I.e. the set of good sync messages is defined as follows:

{good sync MSG}$_i$={sync MSG$k$|$\delta_{sync,k}$<($\delta_{sync,min}$+$\alpha_{sync,i}$) and $i-N_{sync}+1 \leq k \leq i$}

The threshold $\alpha_{sync,i}$ is determined by:

$$\alpha_{sync,i} = \frac{(S_{sync,i} - S_{sync,i-N_{sync}+1}) \cdot \Delta f_{max}}{C_{sync}}$$

In the last equation, $\Delta f_{max}$ designates the maximum possible frequency difference (preferably in ppm) between the master and the slave clocks. This maximum possible frequency difference is obtainable from the specifications of the maximum clock deviations defined for the quartz of the master and the slave clocks. I.e., if the master clock has a maximum frequency deviation of ±100 ppm and the slave clock has a maximum frequency deviation of ±200 ppm, $\Delta f_{max}$ has the value of 300 ppm. Furthermore, the coefficient $C_{sync}$ has a value in order to control the magnitude of $\alpha_{sync,i}$ and is usually bigger than 1, e.g. 10. Due to the above definition of {good sync MSG}$_i$, frequency deviations which may occur in the master and the slave clocks are taken into account in order to determine the correct sync messages being transmitted by a minimum delay via the intermediate switch IS shown in FIG. 1. It was confirmed by experiments that there exists a wide range of values of $C_{sync}$ where the number of good messages remains constant. By using one of those values, messages with a minimum and constant delay can be filtered out.

Analogously to the above sync messages, corresponding good line delay request messages which are transmitted by a minimum delay via the intermediate switch could be determined in the same manner as described above. When the $j^{th}$ delay response message arrives at the slave element, the slave element stores $M_{req,j}$, $S_{req,j}$, $\delta_{req,j}$ in its buffer. Thereafter, based on the last $N_{delay}$ request messages transmitted in a sequence of previous synchronization processes, the following minimum difference is determined:

$$\delta_{delay,min} = \min\{\delta_{req,i-Ndelay+1}, \ldots \delta_{req,i}\}$$

A set of good delay request messages {good delay MSG}$_j$ are determined as follows:

{good delay MSG}$_j$={delay MSG$l$|$\delta_{delay,l}$<($\delta_{delay,min}$+$\alpha_{delay,j}$) and $j-N_{delay}+1 \leq l \leq j$}

I.e, the good delay messages are messages whose counter difference is smaller than the minimum difference $\delta_{delay,min}$ plus a threshold $\alpha_{delay,j}$. The threshold $\alpha_{delay,j}$ is determined analogously to the threshold $\alpha_{sync,i}$ used for the sync messages, i.e.:

$$\alpha_{delay,j} = \frac{(S_{req,i} - S_{req,i-N_{delay}+1}) \cdot \Delta f_{max}}{C_{delay}}$$

$\Delta f_{max}$ is the maximum possible frequency difference (in ppm) mentioned above and the coefficient $C_{delay}$ is a coefficient to control the magnitude of $\alpha_{delay,j}$. Analogously to the above coefficient $C_{sync}$, the value of $C_{delay}$ is bigger than 1, e.g. 10.

It was confirmed by experiments that there exists a wide range of values of $C_{delay}$ where the number of good messages remains constant. By using one of those values, messages with a minimum and constant delay can be filtered out.

According to the first embodiment as described above, the good sync messages and good delay request messages are determined based on a minimum delay plus a threshold. However, in a second embodiment of the invention, it is also possible to determine the good sync messages and good delay request messages based on an approximation of a linear function. This determination will be described in the following.

Analogously to the first embodiment, when the $i^{th}$ new sync message arrives, the slave element stores $M_{sync,i}$, $S_{sync,i}$, $\delta_{sync,i}$ in its buffer. Alternatively and mathematically equivalent, only $M_{sync,i}$ and $S_{sync,i}$ can be used for determining the good sync messages. In that case, $\delta_{sync,i}$ should be replaced by $S_{sync,i} - M_{sync,i}$ in the following steps 1 to 4. The good sync messages from the last $N_{sync}$ sync messages are identified according to the following steps:

In a step 1, a pool of good sync messages comprising all $N_{sync}$ last sync messages is initialized as:

{good sync MSG}$_i$={sync MSG$k$|$i-N_{sync}+1 \leq k \leq i$}

In a step 2, the dependency of the delays of the sync messages on the counter value of the messages is modelled by a linear function having slope a and intercept b and the following equation is solved by the method of least squares:

$$\begin{bmatrix} M_{sync,i-N_{sync}+1} & 1 \\ \vdots & \vdots \\ M_{sync,i} & 1 \end{bmatrix} \cdot \begin{bmatrix} a \\ b \end{bmatrix} = \begin{bmatrix} \delta_{sync,i-N_{sync}+1} \\ \vdots \\ \delta_{sync,i} \end{bmatrix}$$

The last equation can be written in matrix form as follows:

$$M \cdot \begin{bmatrix} a \\ b \end{bmatrix} = \Delta$$

Based on the approximated values $\hat{a}$ and $\hat{b}$ which form the solution of the last equation, approximated values of the delays $\hat{\delta}_{req,j}-N_{delay}+1, \ldots, \hat{\delta}_{req,j}$ can be calculated in step 3 as follows:

$$\begin{bmatrix} \hat{\delta}_{sync,i-N_{sync}+1} \\ \vdots \\ \hat{\delta}_{sync,i} \end{bmatrix} = \begin{bmatrix} M_{sync,i-N_{sync}+1} & 1 \\ \vdots & \vdots \\ M_{sync,i} & 1 \end{bmatrix} \cdot \begin{bmatrix} \hat{a} \\ \hat{b} \end{bmatrix}$$

The last equation can be written in matrix form as follows:

$$\hat{\Delta} = M \cdot \begin{bmatrix} \hat{a} \\ \hat{b} \end{bmatrix}$$

In a step 4, the element-wise difference between and $\hat{\Delta}$ and $\Delta$ and $\Delta$ is calculated. For all k: If the differences between the $k^{th}$ elements is bigger than a threshold $\beta$, then the $k^{th}$ row from $\Delta$ and M is removed. Analogously, the $k^{th}$ element from the message pool {good delay MSG}$_i$ is removed.

The above steps 2 to 4 are repeated until the maximum element-wise difference between $\hat{\Delta}$ and $\Delta$ is smaller than ·. The remaining elements in {good delay MSG}$_i$ give the pool of good sync messages. It was confirmed by experiments that there exists a wide range of values of · where the number of good messages finally obtained in the pool remains constant. By using one of those values, messages with a minimum and constant delay can be filtered out.

Analogously, good delay request messages can be calculated by an approximation of a linear function. When the $j^{th}$ delay response message arrives at the slave element, the slave element stores $M_{req,j}$, $S_{req,j}$, $\delta_{req,j}$ in its buffer. Alternatively and mathematically equivalent, only $M_{req,j}$ and $S_{req,j}$ can be used for determining the good delay request messages. In that case, $\delta_{req,j}$ should be replaced by $S_{req,j}-M_{req,j}$ in the following steps 1 to 4. It identifies "good" delay request messages from the last $N_{delay}$ delay request messages according to the following steps:

In step 1, a pool of good delay request messages comprising the last $N_{delay}$ messages is initialized, i.e.:

{good delay MSG}$_j$={delay MSG$l$|$j-N_{delay}+1 \leq l \leq j$}

In a step 2, a linear function having slope a and intercept b is approximated by the least squares solution of the following equation:

$$\begin{bmatrix} S_{req,j-N_{delay}+1} & 1 \\ \vdots & \vdots \\ S_{req,j} & 1 \end{bmatrix} \cdot \begin{bmatrix} a \\ b \end{bmatrix} = \begin{bmatrix} \delta_{req,j-N_{delay}+1} \\ \vdots \\ \delta_{req,j} \end{bmatrix}$$

The last equation can be written in matrix form as follows:

$$S \cdot \begin{bmatrix} a \\ b \end{bmatrix} = \Delta$$

Based on the approximated value $\hat{a}$ of the slope and $\hat{b}$ of the intercept, the corresponding approximated values of the delays $\hat{\delta}_{req,j}-N_{delay}+1, \ldots, \hat{\delta}_{req,j}$ can be calculated in a step 3 as follows:

$$\begin{bmatrix} \hat{\delta}_{req,j-N_{delay}+1} \\ \vdots \\ \hat{\delta}_{req,j} \end{bmatrix} = \begin{bmatrix} S_{req,j-N_{delay}+1} & 1 \\ \vdots & \vdots \\ S_{req,j} & 1 \end{bmatrix} \cdot \begin{bmatrix} \hat{a} \\ \hat{b} \end{bmatrix}$$

The last equation can be written in matrix form as follows:

$$\hat{\Delta} = S \cdot \begin{bmatrix} \hat{a} \\ \hat{b} \end{bmatrix}$$

In a step 4, the element-wise difference between $\hat{\Delta}$ and $\Delta$ is checked. For all m: If the differences between the $M^{th}$ elements is bigger than a threshold $\beta$, then the $M^{th}$ row good of $\Delta$ and of S is removed. Analogously, the $m^{th}$ element from {good delay MSG}$_i$ is removed.

The above steps 2 to 4 are repeated until the maximum element-wise difference between $\hat{\Delta}$ and $\Delta$ is smaller than $\beta$: The remaining elements in {good delay MSG}$_i$ give the good delay request messages. It was confirmed by experiments that there exists a wide range of values of $\beta$ where the number of good messages finally obtained in the pool remains constant. By using one of those values, messages with a minimum and constant delay can be filtered out.

Based on the above determination of good sync messages and delay request messages according to both the first and the second embodiments, a line delay is estimated. This estimation is the same for both embodiments and will be described in the following. At first, a so-called RFC value (RFC rate compensation factor) representing the ratio of the master clock frequency to the slave clock frequency is calculated as follows:

$$RCF_i = \frac{(M_{sync,max\{good\ sync\ MSG\}_i} - M_{sync,min\{good\ sync\ MSG\}_i})}{(S_{sync,max\{good\ sync\ MSG\}_i} - S_{sync,min\{good\ sync\ MSG\}_i})}$$

According to the last equation, the RFC value is calculated by the difference of the maximum and minimum counter values out of the pool of good sync messages measured in the master clock divided by the difference between the maximum and minimum counter values out of the pool of good sync messages measured in the slave clock.

Eventually, the line delay is estimated by the slave element by calculating the average of the counter values of good sync messages and good delay request messages for both the master clock and the slave clock. I.e., the following mean values are determined:

$$\overline{M}_{sync\_good,i} = \text{mean}(\{M_{sync,k} | k \in \{\text{good sync MSG}\}_i\})$$

$$\overline{S}_{sync\_good,i} = \text{mean}(\{S_{sync,k} | k \in \{\text{good sync MSG}\}_i\})$$

$$\overline{M}_{delay\_good,j} = \text{mean}(\{M_{req,l} | l \in \{\text{good delay MSG}\}_j\})$$

$$\overline{S}_{delay\_good,j} = \text{mean}(\{S_{req,l} | l \in \{\text{good delay MSG}\}_j\})$$

Based on the above mean values and the above RFC value, the line delay is estimated as follows:

$$\hat{LD} = \left| \frac{(\overline{S}_{delay\_good,j} - \overline{S}_{sync\_good,i}) \cdot RCF_i - (\overline{M}_{delay\_good,j} - \overline{M}_{sync\_good,i})}{2} \right|$$

This estimated line delay only considers messages having the same minimum delay and, thus, is suitable for synchronizing the slave clock with the master clock. To do so, the slave element updates the master time when receiving a good sync message, i.e. the counter value according to the master clock for the time when a good sync message is received is calculated by:

$$\hat{M}_i = M_i + \hat{LD}$$

For a given slave counter S(t), the corresponding master counter can then be calculated by:

$$\hat{M}(t) = \hat{M}_i + (S(t) - S_{sync,i}) \cdot RCF_i$$

According to the above described embodiments, a line delay for a transmission path between a master element and a slave element comprising an intermediate switch can be estimated although the intermediate switch can cause arbitrary delays, e.g. due to congestion. This is possible because it was realized that the majority of the messages pass through the intermediate switch with a constant and minimum delay. By identifying those messages, a line delay can be estimated and a corresponding clock synchronization of a slave element can be performed.

The invention claimed is:

1. A method for synchronizing clocks in a communication network, wherein a first clock of a first network element is used for synchronizing at least one second clock of one or more second clocks of one or more second network elements, comprising:
the first network element sending a plurality of first messages to one of the second network elements, each of the first messages having a first counter identifying a time of the first clock at which the first message was sent by the first network element, each of the first messages being a synchronization message to synchronize the first clock with the second clock of the second network element;
the second network element receiving each of the first messages;
in response to receiving each of the first messages, the second network element recording a time of the second clock corresponding to when the first message was received by the second network element as a first message received time value;
the second network element saving the first counter of the first message for each of the received first messages;
the second network sending a plurality of second messages to the first network element, each of the second messages identifying a second counter to identify a time of the second clock at which the second network element sent the second message;
the second network element saving the second counter for each second message;
the first network element receiving each of the second messages;
in response to the second messages, the first network element sending a plurality of third messages, each of the third messages sent in response to a respective one of the second messages received by the first network element, each of the third messages having a third value identifying a value of the first clock at a time the first network element received the second message;
the second network element receiving each of the third messages from the first network element;
the second network element saving the third value of the third message for each of the received third messages;
the second network element applying a filtering method to filter data from the first messages and third messages for determining a line delay affecting communications between the first and second network elements, the filtering method comprising:
identifying data from first messages received from the first network element that are from first messages having a transmission delay in passing from the first network element to the second network element at or below a first threshold to filter the first messages so that a filtered subset of the first messages is identified and data from the filtered subset of first messages is identified to determine the line delay, and
identifying data from third messages received from the first network element that are from third messages having a transmission delay in passing from the first network element to the second network element at or below a second threshold to filter the third messages so that a filtered subset of the third messages is identified and data from the filtered subset of third messages is identified to determine the line delay;
the second network element estimating the line delay in an estimation calculation comprising:
determining a rate compensation factor by:
determining a first difference of a maximum value of the first counter value from the filtered subset of first messages and a minimum value of the first counter value from the filtered subset of first messages,
determining a second difference between a maximum value of the first message received time value from the filtered subset of first messages and a minimum value of the first message received time value from the filtered subset of first messages, and
determining a quotient from the first difference and the second difference;
determining a first average of first counter values from the first messages of the filtered subset of first messages,
determining a second average of first message received time values from the first messages of the filtered subset of first messages,
determining a third average of third values from the third messages of the filtered subset of third messages,
determining a fourth average of second counter values from the second messages to which the third messages of the filtered subset of third messages responded, determining a third difference between the second average and the fourth average, applying the rate compensation factor to the third difference to modify the third difference, determining a fourth difference between the third average and the first average, determining a fifth difference between the modified third difference and the fourth difference; and the second network element applying the determined line delay to time information communicated by the first network element to synchronize the second clock with the first clock.

2. The method according to claim 1, wherein the estimation calculation also comprises dividing the fifth difference in half to determine the line delay.

3. The method according to claim 2, wherein the first network element is a master element and the second network element is a slave element.

4. The method of claim 1, wherein the second messages are line delay request messages and the third messages are line delay response messages.

5. The method according to claim 1, further comprising the second network element updating a time identified in a fourth message received from the first network element by adding the determined line delay to that time identified in the fourth message.

6. The method of claim 1, wherein the first threshold is determined from a constant function comprising determining a minimum delay value and adding a first constant value and the second threshold is determined from a constant function comprising determining a minimum delay value and adding a second constant value.

7. The method according to claim 6, wherein the first and second constant values depend on a maximum clock frequency difference between the first clock and the second clock.

8. The method according to claim 6, wherein the first constant value depends on a difference between the first message received time value for a most recently received first message of the filtered subset of first messages and the first message received time value for an oldest first message of the subset of filtered first messages.

9. The method according to claim 6, wherein the second constant value depends on a difference between the second counter value of a most recently sent one of the second messages to which one of the third messages of the filtered subset of third messages responded and the second counter value of an oldest one of the second messages to which one of the third messages of the filtered subset of third messages responded.

10. The method according to claim 2, wherein the first threshold is determined from a first linear function expressing dependency of time in which it takes the first messages to travel from the first network element to the second network element plus a first constant threshold value.

11. The method according to claim 10, wherein the second threshold is determined from a second linear function expressing dependency of time in which it takes the second messages to travel from the second network element to the first network element plus a second constant threshold value.

12. The method according to claim 10, wherein the filtering method comprises identifying the first messages in an iteration process wherein in each iteration step of the iteration process, the first linear function is approximated and first messages are filtered out so that such first messages are not within the filtered subset of first messages when those first messages are determined to have a time in which it takes those first messages to be transmitted from the first network element to the second network element to be removed from the first sequence which are transmitted within first delays above a value equal to the first threshold whereupon remaining first messages that no longer include the removed messages forms a basis for a next iteration step of the iteration process.

13. The method according to claim 12, comprising terminating the iteration process when all remaining first messages are below a sum of the first linear function plus the first constant threshold value.

14. The method of claim 1, wherein the second threshold is determined from a second linear function expressing dependency of time in which it takes for the first network element to receive the second message plus a second constant threshold value or the dependency of the time of receiving the second message on the time of sending the second message plus a second constant threshold value.

15. The method according to claim 14, wherein the time of sending the second message is expressed as the second counter.

16. The method according to claim 14, wherein the filtering method comprises identifying the third messages having a delay at or below the second threshold via an iteration process wherein in each iteration step of the iteration process, the second linear function is approximated and second messages are removed from the subset of second messages when those messages are determined to have delays above the approximated second linear function plus the second constant threshold value, whereupon the reduced number of second messages no longer including the removed messages are a basis of the next iteration step for approximating the second linear function.

17. The method according to claim 16, wherein the iteration terminates when all remaining third messages within the subset of third messages have delays that are below a sum of the second linear function plus the second constant threshold value.

18. The method of claim 1, wherein the first messages are messages for chock synchronization according to a standard selected from the group consisting of IEEE 1588, IEEE 802.1 as, and IEEE 802.1av.

19. The method of claim 1 wherein the first network element and second network element are nodes of a communication network.

20. The method of claim 19 wherein the communication network also comprises at least one switch in a communication path formed between the first network element and the second network element along which the first, second and third messages pass.

* * * * *